Patented Nov. 4, 1952

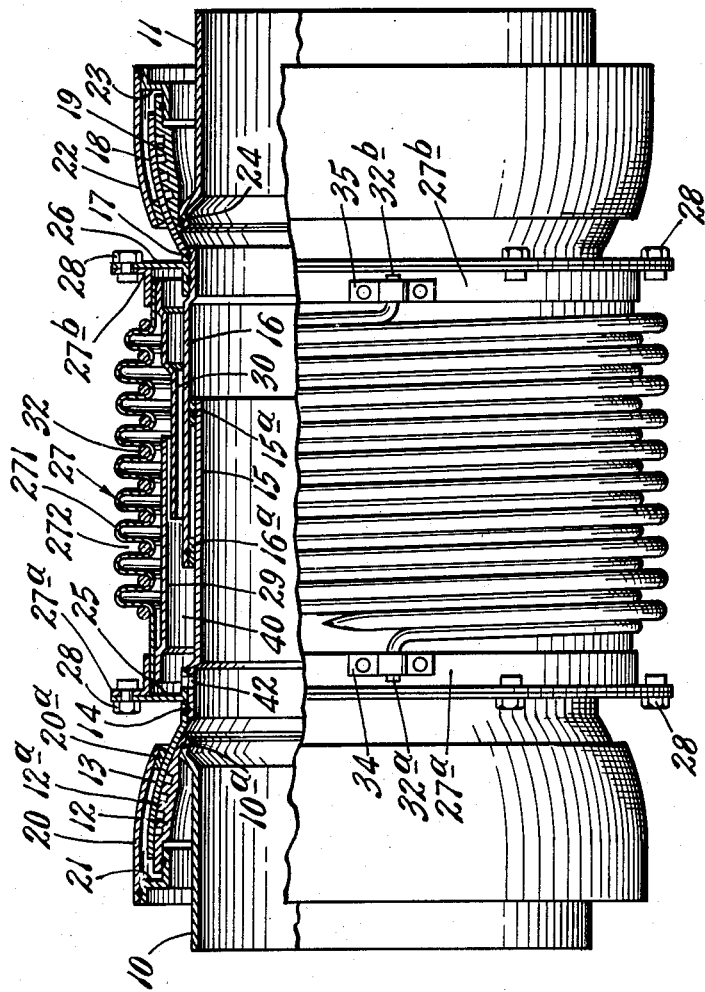

2,616,728

UNITED STATES PATENT OFFICE 2,616,728

FLEXIBLE EXHAUST PIPE JOINT

Paul A. Pitt, San Diego, Calif., assignor to Solar Aircraft Company, San Diego, Calif., a corporation of California Application February 20, 1948, Serial No. 9,712

4 Claims. (Cl. 285—11)

This invention relates to flexible pipe joints and is particularly intended for use in exhaust lines of aircraft engines.

A general object of the invention is to provide a practicable and durable joint construction that is more effective in sealing against gas leakage, especially in large sizes.

Other more specific objects and features of the invention will become apparent from the description to follow.

It has heretofore been proposed to form a flexible joint in the exhaust line of an aircraft by providing a pair of spaced-apart ball-type joints to permit the necessary flexing, and to provide a telescoping joint between the ball-type joints to permit longitudinal extension and contraction. It has also been proposed to maintain contact between the nesting ball sections by the use of compression springs that act between the two ball sections to urge them apart.

In accordance with the present invention, the seal between the ball sections is maintained in part by gas pressure resulting from a novel construction including a bellows enclosing the telescopic joint, and in part by a single, helical compression spring. The spring not only exerts a longitudinal force tending to maintain the ball sections in contact with each other, but reinforces the bellows against radial expansion.

Referring now to the drawing, the single figure thereof is a side elevation, with a portion broken away, of a joint in accordance with the invention.

The flexible joint constituting the invention is shown in the drawing as interconnecting two nipples 10 and 11, respectively, so that they can move either laterally or longitudinally relative to each other.

Thus the inner end 10a of the nipple 10 is secured, as by welding, to a first sealing member consisting of a ball element 12 that extends outwardly about the nipple 10 and has an outer annular sealing surface 12a that seats against a complementary annular sealing surface on a second sealing member consisting of a sheet metal socket 13. The inner end of the socket 13 is attached, as by welding 14, to the outer end of an internal tube 15 which is in telescoping relation with an external tube 16. The internal tube 15 may have a wear band 15a on its outer surface which bears against the external tube 16, and the latter may have an internal wear band 16a that bears against the internal tube 15. The external tube 16 is secured at its outer end, as by welding 17, to the inner end of a socket 18 that is similar to the socket 12 and cooperates with a ball section 19 that is similar in all respects to the ball section 12 and is secured by welding 24 at its inner end to the other nipple 11.

To prevent separation of the ball element 12 and the socket 13, a segment 20 may be provided exterior thereof, this segment being of spherical curvature and being attached at its outer end by a collar 21 to the outer end of the ball element 12, and having at its inner end a wear strip 20a that bears against the outer surface of the socket 13. A similar segment 22 and collar 23 is provided to retain the socket 18 against the ball element 19.

In order to prevent leakage, the socket 13 must be urged against the ball 12, and the socket 18 must be urged against the ball 19. This is accomplished by providing forces constantly urging the sockets 13 and 18 apart from each other and against their related ball surfaces.

To this end, an outwardly extending flange 25 is secured to the telescoping tube 15, and a similar flange 26 is secured to the telescoping tube 16, and a tubular, corrugated bellows 27 which surrounds the telescoping tubes 15 and 16, is secured at its ends to the flanges 25 and 26, respectively. Thus, the bellows 27 is provided with end mounting flanges 27a and 27b which are bolted by bolts 28 to the flanges 25 and 26, respectively. To partially protect the bellows 27 from heat radiated from tubes 15 and 16, a pair of loosely fitted telescopic tubes 29 and 30 are provided interior of the bellows 27 but exterior of the telescoping tubes 15 and 16.

The bellows 27 is provided with corrugations of helical configuration, which define a helical flange 271 and a helical groove 272. There is mounted within the helical groove 272 a compression spring 32, the major portion of which rests in the bottom of the helical groove 272 and is secured at its opposite ends against unwinding. Thus one end 32a is bent at right angles and connected by a hook 34 to the end mounting flange 27a of the bellows, while the other end 32b is similarly secured by a clip 35 to the end mounting flange 27b of the bellows.

The socket members 13 and 18 are urged apart against their associated ball members in part by the expansive force longitudinally of the spring 32, and in part by gas pressure developed within the annular chamber 40 between the telescoping tubes 15 and 16 and the bellows 27, which chamber is in communication with the exhaust gases being conducted by the joint through an aperture 42 in the telescoping member 15 and the flange 25.

In large sizes of joints, the pressure developed in the chamber 40 might seriously stress the bellows 27 radially and such stress is in part compensated for in accordance with the present invention by the spring 32 which, as previously indicated, is compressed longitudinally but is contracted radially. As the joint expands, the spring 32 tends to contract radially, and thereby further reinforce the bellows 27 against radial expansion when it is stretched.

Although for the purpose of explaining the invention, a particular embodiment thereof has been shown and described, obvious modifications will occur to a person skilled in the art, and I do not desire to be limited to the exact details shown and described.

I claim:

1. A flexible joint for conveyance of fluid under pressure comprising: a first pair of spaced-apart sealing members having facing, annular sealing surfaces of spherical curvature and adapted to be respectively connected to two conduits movable relative to each other; a second pair of spaced-apart sealing members having oppositely directed annular sealing surfaces of spherical curvature seating against the annular sealing surfaces of said first sealing members; a tubular, longitudinally expansible bellows member anchored at its opposite ends to and interconnecting said second pair of sealing members; said bellows being normally compressed longitudinally whereby it urges said second pair of sealing members against the first members; first and second pairs of telescoping tubular members positioned within said bellows member in spaced relation thereto, the first pair being positioned within the second pair in spaced relation thereto, the two telescoping members of each pair being connected respectively to the two members of said second pair of sealing members, said first pair of telescoping members being closely fitted to minimize gas leakage therebetween, and said second pair being loosely fitted in overlapping relation to shield said bellows member from heat radiated from said first pair of telescoping members.

2. A flexible conduit for fluid conduction under pressure comprising: a tubular longitudinally expansible bellows element having a helical corrugation and groove therein, and a helical compression spring nesting in the bottom of said groove, the ends of said spring being anchored to opposite end portions of said bellows whereby radial expansion of said bellows is restrained.

3. A flexible joint for fluid conduction under pressure comprising: a first sealing member adapted to be secured at one end to a first conduit and having an annular sealing surface facing away from said first conduit; a second sealing member adapted to be connected to a second conduit and having an annular sealing surface seating against the sealing surface of said first member; a tubular longitudinally expansible bellows element interconnecting said second sealing member with said second conduit, said bellows element being compressed longitudinally and having a continuous helical corrugation and groove therein; and a helical compression spring nesting in the bottom of said groove, the ends of said spring being anchored to opposite end portions of said bellows whereby radial expansion of said bellows is restrained and it applies an axial thrust from said second conduit to said second sealing member to urge it into sealing relation with said first sealing member.

4. A flexible joint for fluid conduction under pressure comprising: a first sealing member adapted to be secured at one end to a first conduit and having an annular sealing surface of spherical curvature facing away from said first conduit; a second sealing member adapted to be connected to a second conduit and having an annular sealing surface of spherical curvature seating against the sealing surface of said first member; a tubular, longitudinally expansible bellows element interconnecting said second sealing member with said second conduit, said bellows element having a continuous helical corrugation and groove therein; a helical compression spring nesting in the bottom of said groove, the ends of said spring being anchored to opposite end portions of said bellows whereby radial expansion of said bellows is restrained; said bellows element being compressed longitudinally whereby it applies an axial thrust from said second conduit to said second sealing member to urge it into sealing relation with said first sealing member.

PAUL A. PITT.

REFERENCES CITED

The following references are of record in the file of this patent:

UNITED STATES PATENTS

| Number | Name | Date |
|---|---|---|
| 289,265 | Hurly | Nov. 27, 1883 |
| 866,061 | Phillips | Sept. 17, 1907 |
| 2,207,146 | Fentress | July 9, 1940 |
| 2,242,604 | Wells | May 20, 1941 |
| 2,414,987 | Tobey | Jan. 28, 1947 |
| 2,451,252 | Stoeckly | Oct. 12, 1948 |